United States Patent
Liu

(10) Patent No.: US 7,959,306 B2
(45) Date of Patent: Jun. 14, 2011

(54) DISPLAYING METHOD OF DIGITAL LIGHT PROCESSING (DLP) PROJECTOR AND DLP PROJECTOR USING THE SAME

(75) Inventor: Chin-Ku Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 419 days.

(21) Appl. No.: 12/136,115

(22) Filed: Jun. 10, 2008

(65) Prior Publication Data

US 2009/0161080 A1 Jun. 25, 2009

(30) Foreign Application Priority Data

Dec. 18, 2007 (TW) .............................. 96148365 A

(51) Int. Cl.
*G03B 21/28* (2006.01)
(52) U.S. Cl. ............................... 353/99; 349/5; 348/771
(58) Field of Classification Search .................... 353/99, 353/98, 37; 349/5; 348/771, 743, 742
See application file for complete search history.

(56) References Cited

U.S. PATENT DOCUMENTS

| 7,614,754 | B2 * | 11/2009 | Liu et al. | 353/98 |
| 2006/0238719 | A1 * | 10/2006 | Liu et al. | 353/37 |
| 2009/0161080 | A1 * | 6/2009 | Liu | 353/99 |
| 2009/0195752 | A1 * | 8/2009 | Wang et al. | 353/22 |
| 2010/0165307 | A1 * | 7/2010 | Mizushima et al. | 353/98 |

FOREIGN PATENT DOCUMENTS

| JP | 8-195963 | 7/1996 |
| JP | 2004145249 A | 5/2004 |
| JP | 2008020867 A | 1/2008 |

* cited by examiner

*Primary Examiner* — John R Lee
(74) *Attorney, Agent, or Firm* — Chuh-Ming Shih

(57) ABSTRACT

A displaying method of a digital light processing (DLP) projector includes the steps of: providing a light modulation device including a driver printed circuit board and a digital micromirror device (DMD), wherein the DMD includes a plurality of micromirrors each having a first stable state and a second stable state, and a predetermined light incident direction, the DMD is installed on the driver printed circuit board; providing an illumination light beam being incident on the DMD along an operating direction different from the predetermined light incident direction, modulating the illumination light beam to an imaging light beam by the DMD and directing the imaging light beam to a projection lens for projecting an image. A DLP projector made thereby has a relatively lower manufacturing cost.

14 Claims, 4 Drawing Sheets

DISPLAYING METHOD OF DIGITAL LIGHT PROCESSING (DLP) PROJECTOR AND DLP PROJECTOR USING THE SAME

BACKGROUND

1. Technical Field

The present invention relates to a displaying technique of a digital projection, especially to a displaying method of DLP and a DLP projector.

2. Description of the Related Art

DLP projector becomes to be one of the mainstream digital projectors, and the imaging principle is illustrated as follows. Referring to FIG. 1, the projector 100 includes an illuminating system 110, a light modulation device 120 and a projection lens 130. The light modulation device 120 includes a driver printed circuit board (PCB) 121, and a digital micromirror device (DMD) 122 disposed on the driver PCB 121. The DMD 122 has a predetermined light incident direction. The light system 110 includes a light source 112, a light rod integrator 113, a plurality of condenser lenses 114 and a reflection mirror 116a. After the illumination light beam 112a emitting from the light source 112, the illumination light beam 112a passing through the rob integrator 113 and the condenser lenses 114 is reflected by the reflection mirror 116a, and is incident to the DMD 122 along the predetermined light incident direction, thereby the DMD 112 modulates the illumination light beam 112a to an imaging light beam 112a', and reflects the imaging light beam 112a' to the projection lens 130. Then the projection lens 130 will project the image beam 112a' to a screen (not shown) for displaying image.

Referring to FIG. 2, the DMD 122 includes a plurality of bistable micromirrors 123. Each micromirror 123 represents a pixel or a sub-pixel. The bistable micromirror 123 has two different oblique angle states, for instance, the oblique angle is at plus 12 degrees in a first stable state, and at minus 12 degrees in a second stable state. When the illumination light beam 112a is incident on the DMD 122 along the predetermined light incident direction thereof, the micromirror 123 in the first stable state (a solid line shown in FIG. 2) reflects the light beam to the projector 130, and the micromirror 123 in the second stable state (a broken line shown in FIG. 2) reflects the light beam to a direction different from the direction to the projector 130. At this point, the first stable state is a light on-state; and the second state is a light off-state.

The predetermined light incident direction of the DMD 122 depends on a manufacture process and a driver wafer of the DMD 122. Generally, the manufacturers of the DMD mark a recognizing pattern on the DMD for facilitating the assembly workers to recognize the predetermined light incident direction, such as the recognizing pattern 112a of the DMD 122 shown in FIG. 1.

When a state of one of the micromirrors fails to be controlled by the digital imaging signal, this micromirror is a defect dot. The defect dot can be classified as two types, the micromirror continuously in on-state is defined as bright defect dot, and the micromirror continuously in off-state is defined as dark defect dot. Usually, the dark defect dot may not to be easily recognized by a viewer, thereby a few of dark defect dots are allowed, but the bright defect dot may easily be recognized by a viewer since it may induce the optical discomfort. Therefore, in advantage, the bright defect dot is not allowed.

When the illumination light beam 112 is incident along the predetermined light incident direction of the DMD 122, if the DMD 122 has bright defect dot, the product must be abandoned because it fails to conform a delivery standard. Thus, a manufacturing yield rate of the projector will be lowered. To some extents, the manufacturing cost will be increased.

BRIEF SUMMARY

The present invention provides a displaying method of a DLP projector, and it makes the DLP projector have a lower manufacturing cost.

The present invention also provides a DLP projector having a relatively lower manufacturing cost.

An embodiment of the present invention provides a displaying method of a DLP projector, the displaying method including the steps of: (a) providing a light modulation device, the light modulation device including a driver PCB; and a DMD including a plurality of micromirrors and a predetermined light incident direction, a position of each micromirror being one of a first stable state and a second stable state, and the DMD disposed on the driver PCB, wherein each micromirror in the first stable state reflects a light ray being incident thereon along the predetermined light incident direction to a projection lens, and each micromirror in the second stable state reflects the light ray being incident thereon along the predetermined light incident direction to a direction outside the projection lens; and (b) providing an illumination light beam, the illumination light beam being incident on the DMD along an operating direction different from the predetermined light incident direction, wherein each micromirror in the second stable state reflects a light ray of the illumination light beam being incident thereon along the operating direction to a projection lens for projecting an image, and each micromirror in the first stable state reflects the light incident thereon along the operating direction to a direction outside the projection lens.

Another embodiment of the present invention provides a DLP projector, the DLP projector including an illuminating system, having a light source capable of emitting an illumination light beam; a projection lens capable of projecting an image; and a light modulation device including a driver PCB; and a DMD including a plurality of micromirrors and a predetermined light incident direction, a position of each micromirror being one of a first stable state and a second stable state, and the DMD disposed on the driver PCB, wherein each micromirror in the first stable state reflects a light ray being incident thereon along the predetermined light incident direction to a projection lens, and each micromirror in the second stable state reflects the light ray being incident thereon along the predetermined light incident direction to a direction outside the projection lens; wherein the illumination light beam is incident on the DMD along an operating direction different from the predetermined light incident direction, each micromirror in the second stable state reflects a light ray of the illumination light beam being incident thereon along the operating direction to a projection lens for projecting an image, and each micromirror in the first stable state reflects the light ray of the illumination light beam being incident thereon along the operating direction to a direction outside the projection lens.

The illumination light system is incident to the DMD along a direction different from a predetermined light incident direction. Therefore, when the illumination light beam is incident to the DMD along the predetermined light incident direction, the DMD with bright defect dot and without dark defect dot may be reused, to change the bright defect dot to the dark defect dot to conform a delivery standard. To some extents, the manufacturing cost of the DLP projector is lowered.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component directly or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The First Embodiment of the Present Invention

Figure 1:
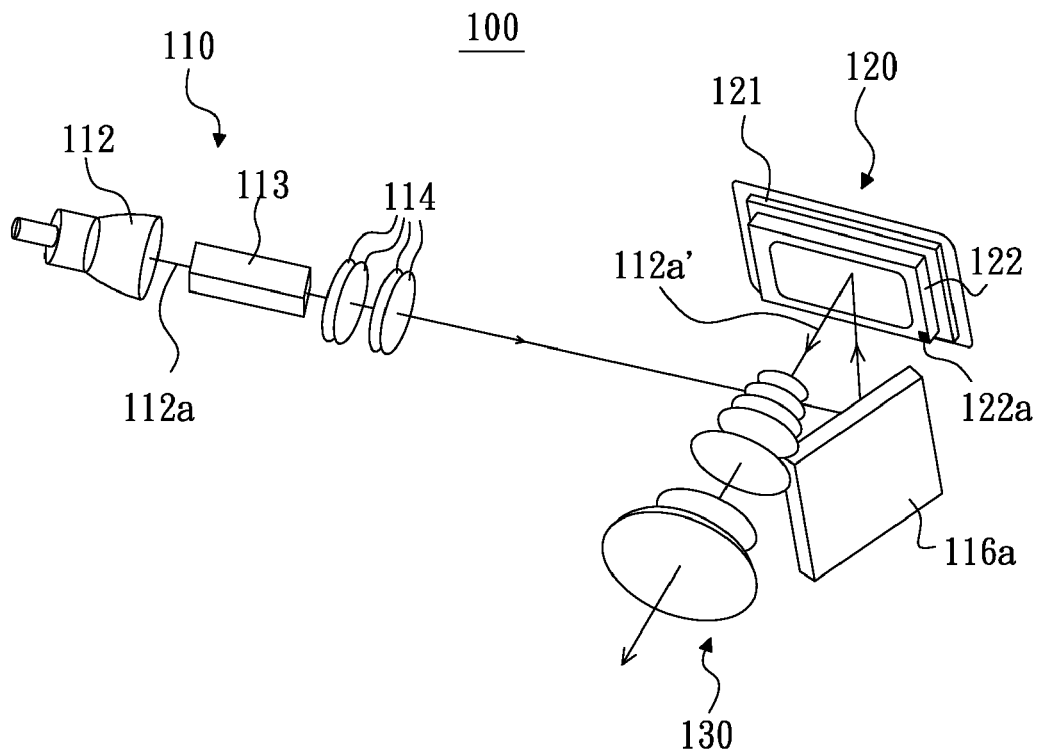
FIG. 1 is a schematic view of a projector of a prior art.
Figure 2:
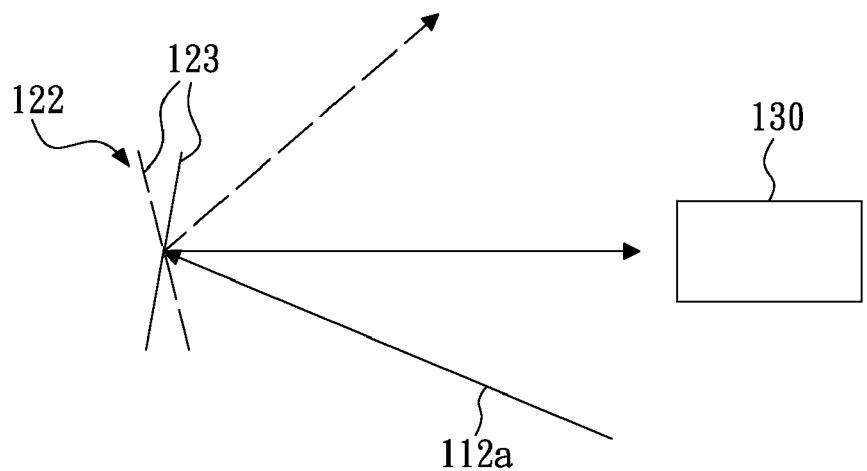
FIG. 2 is an operating schematic view of a micromirror of the projector in FIG. 1.
Figure 3:
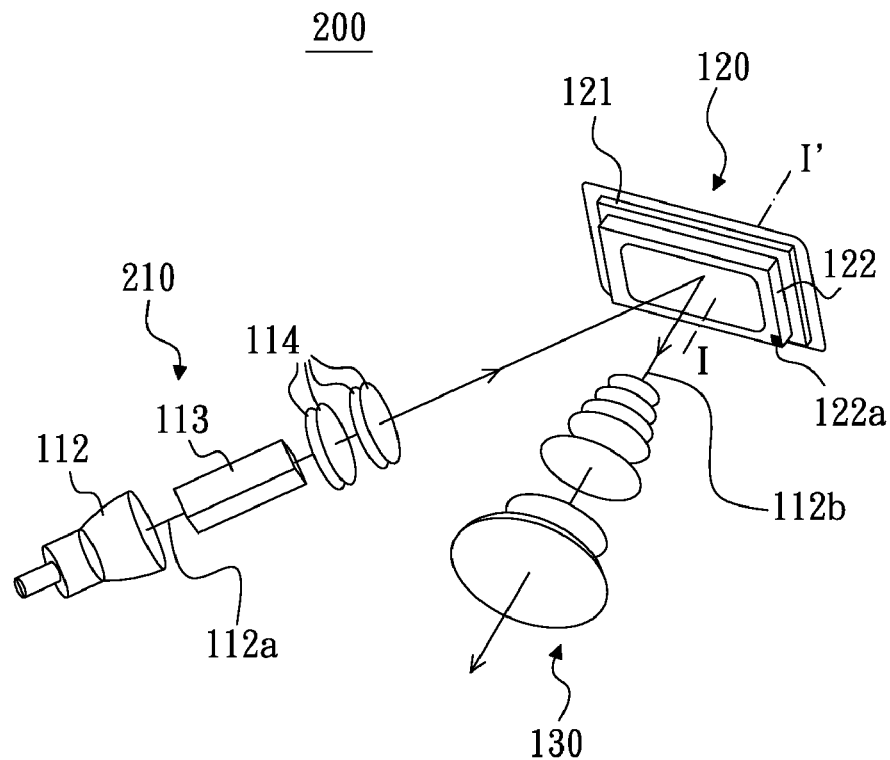
FIG. 3 is a schematic view of a first embodiment of the present invention.
Figure 4:
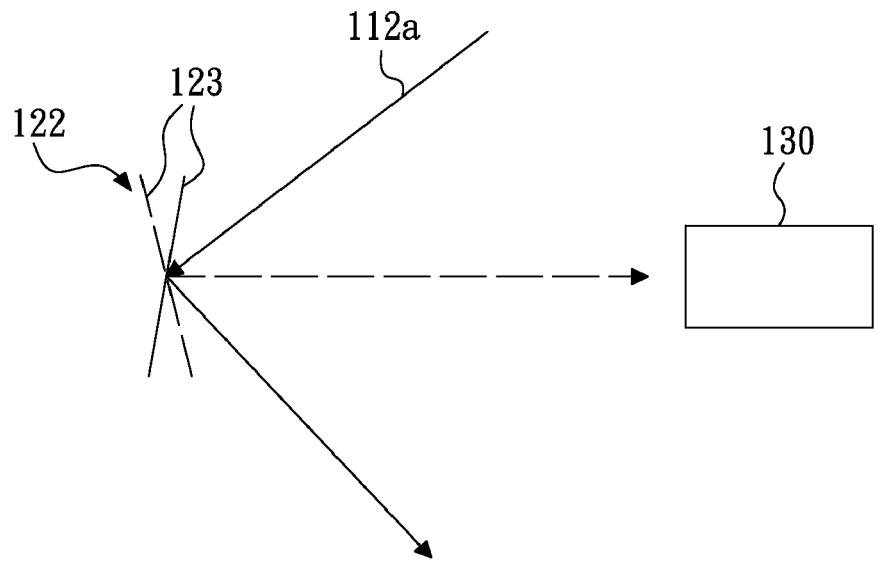
FIG. 4 is an operating schematic view of a micromirror of the projector in FIG. 6.

In a preferred embodiment of the present invention, referring to FIG. 3, the digital light processing (DLP) projector 200 includes an illuminating system 210, a light modulation device 120 and a projection lens 130. The light modulation device 120 includes a driver printed circuit board (PCB) 121 and a digital micromirror device (DMD) 122 attached to the PCB 121. The illuminating system 210 includes a light source 112, a light rod integrator 113 and a plurality of condenser lenses 114, but no reflecting mirror such as the reflecting mirror 116a in FIG. 1 is arranged therein. The illumination light beam 112a emitting from the light source 112 is incident to the DMD 122 along an operating direction different from a predetermined light incident direction of the DMD 122 via the rod integrator 113 and the condenser lenses 114. The DMD 122 may modulate the illumination light beam 112a into an imaging light beam 112b, and projects the imaging light beam 112b to the projection lens 130. An axis of the illumination light beam 112a is linear from the light source 112 to the DMD 122 (as shown in FIG. 3). Referring also to FIG. 2, the predetermined light incident direction is defined as follow. When a light ray in the illumination light beam 112a is incident to the DMD 122 along the predetermined light incident direction, the light ray may be reflected to the projection lens 130 by the DMD 123 (a solid line shown in FIG. 2) which is in a first stable state, and be reflected to another direction outside the projection lens 130 by the DMD 123 (a broken line shown in FIG. 2) which is in a second stable state. At this point, the first stable state is a light on-state; and the second state is a light off-state. Referring also to FIG. 4, the operating direction is defined as follow. When a light ray in the illumination light beam 112a is incident to the DMD 122 along the operating direction, the light ray may be reflected to the projection lens 130 by the DMD 123 (a solid line shown in FIG. 4) which is in a first stable state, and be reflected to another direction outside the projection lens 130 by the DMD 123 (a broken line shown in FIG. 4) which is in a second stable state. At this point, the second stable state is a light on-state; and the first state is a light off-state.

In order to facilitate the following description, a first design is referred that a light beam 112a emitting from the illuminating system 110 is incident to the DMD 122 along the predetermined light incident direction; a second design is referred that a light beam 112a emitting from the illuminating system 110 is incident to the DMD 122 along the operating direction.

In the preferred embodiment of the present invention, in order to facilitate the manufacture, the illuminating system 210, the light modulation device 120, or the projection lens 130 can be integrated to a module. Therefore, in an alternative illuminating system, the modulation device 120 or the projection lens 130 of the projector 200 with the second design can be replaced by the modulation device 120 or the projection lens 130 of the projector 100 with the first design, and there is no need to redesign the same components for the different projector.

Figure 5:
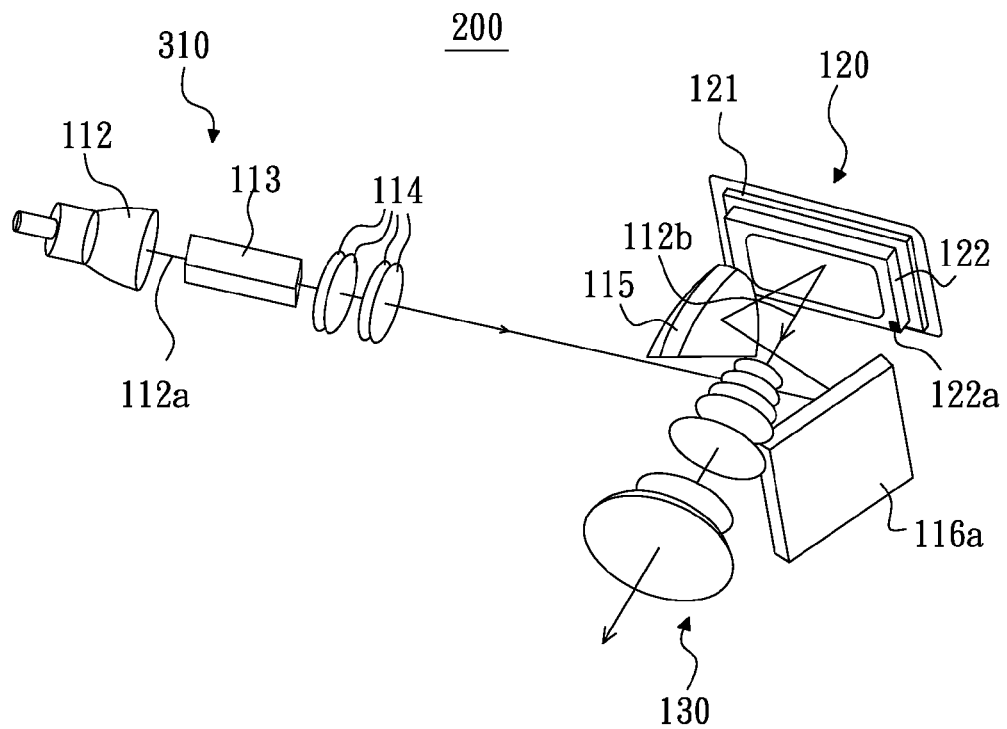
FIG. 5 is a schematic view of another state of the first embodiment of the present invention.

For example, in another embodiment of the present invention, referring also to FIG. 5, the illuminating system 110 in FIG. 1 may be redesigned by adding a reflecting mirror 115 to guide the lighting beam 112a emitting from the illuminating system 310 to the DMD 122 along an operating direction different from the predetermined light incident direction. Thus, the modulation device 120 or the projection lens 130 of the projector 200 with the second design may be replaced by the modulation device 120 or the projection lens 130 of the projector 100 with the first design. Only an extra reflecting mirror 115 is needed for the illuminating system 310 of the projector 100 with the first design to be changed into the illuminating system 310 of the projector 200 with the second design.

A displaying method of the DLP projector 200 includes the following steps: (a) providing a light modulation device 120 including a driver PCB 121 and a DMD 122; wherein the DMD 122 includes a plurality of micromirrors 123 with each having a first stable state and a second stable state, and a predetermined light incident direction (can be recognized by the displaying pattern 122a in FIG. 3 and FIG. 5), the DMD 122 is installed on the driver PCB 121 in a predetermined orientation which is predisposed on the driver PCB 121; (b) providing a illumination light beam 112a being incident to the DMD 122 along the operating direction different from the predetermined light incident direction, modulating the illumination light beam 112a to an imaging light beam 112b by the DMD 122 and directing the imaging light beam 112b to a projection lens 130 for image projection. When the illuminating system 110 is converted to the illuminating system 210 or converted to the illuminating system 310 by adding the reflecting mirror 115, the light modulation device 120 and projecting lens 130 thereof are unchanged, the lighting beam 112a can be incident to the DMD 122 from a direction different from the predetermined light incident direction of the DMD 122.

Furthermore, different light modulation devices 120 can be used in the projector 100 with the first design and the projector 200 with the second design, so that the same illuminating system 110 and the projection lens 130 of the projector 100 with the first design can be used in the projector 200 with the second design. An example will illustrate in a following second embodiment of the present invention.

The Second Embodiment OF THE Present Invention

Figure 6:
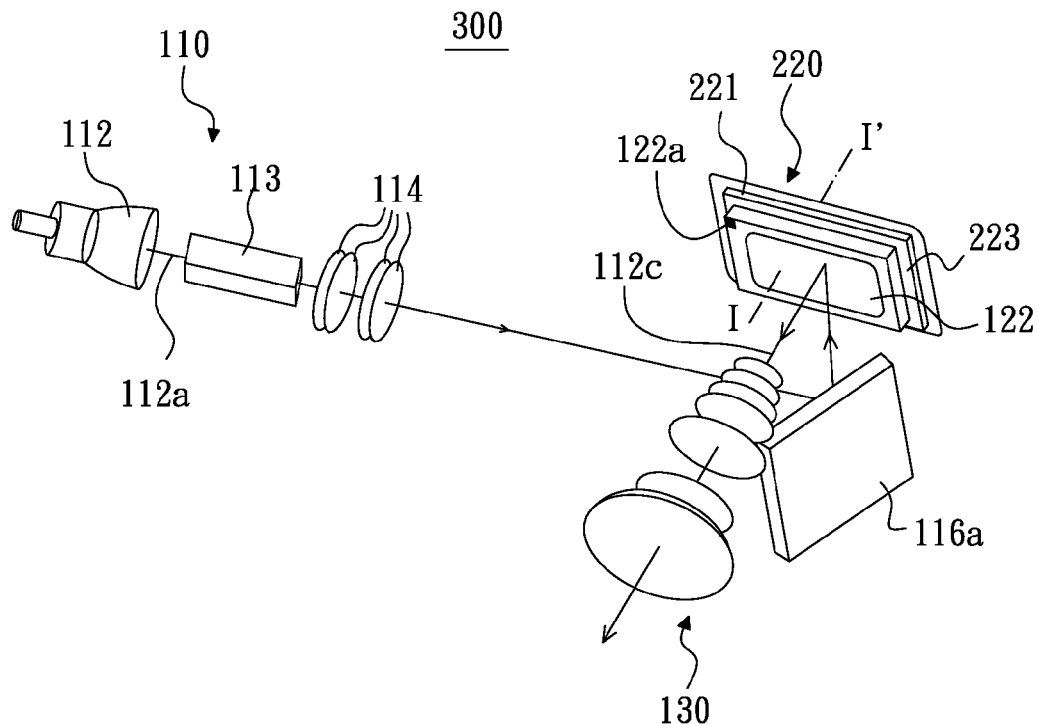
FIG. 6 is a schematic view of a second embodiment of the present invention.

Referring to FIG. 6, the DLP projector 300 includes a light modulation device 220, an illuminating system 110 and a projection lens 130. The light modulation device 220 includes a driver PCB 221 and a DMD 122 disposed on the driver PCB 221. Usually, a DMD 122 is disposed on the driver PCB 221 at a predetermined orientation relative to the driver PCB 221 in the projector 300, but the DMD 122 is disposed on the driver PCB 221 at an operating orientation relative to the driver PCB 221. The operating orientation has an angle relative to the predetermined orientation.

The illuminating system 110 includes a light source 112, a light rod integrator 113, a plurality of condenser lenses 114 and a reflecting mirror 116a. An illumination light beam 112a emitting from the light source 112 is reflected by the reflecting mirror 116a, and incident to the DMD 122 along an operating direction that different from a predetermined light incident direction of the DMD 122 via the rod integrator 113 and the condenser lenses 114.

The difference between the modulation device 220 of the projector 300 with the second design and the modulation device 120 of the projector 100 with the first design lies in the different structure of the light modulation device 220. The DMD 122 is rotated about a normal vector I-I' through a surface of the DMD 122 at some angles, for example, 180 degrees, so that the DMD 122 is disposed on a surface 223 of the driver PCB 221 at an operating orientation. Therefore, the operating orientation is defined at an angle rotated from the DMD 122 about a normal vector I-I' through a surface of the DMD 122, for example, 180 degrees, relative to the predetermined light incident direction. The driver PCB 221 is used to provide a digital image signal, such that the DMD 122 is controlled to modulate the illumination light beam 112a which being incident to the DMD 112 to an imaging light beam 112c, and the imaging light beam 112c is directed into the projection lens 130. The illuminating system and the projection lens 130 of the projector 100 with the first design may be used in the projector 300 with the second design. Only the light modulation device 220 of the projector 300 with the second design needs to be manufactured.

A displaying method of the DLP projector 300, includes the following steps: (a) providing a light modulation device 220 including a driver PCB 221 and a DMD 122; wherein the DMD 122 includes a plurality of micromirrors 123 with each having a first stable state and a second stable state, and a predetermined light incident direction (may be recognized by the displaying pattern 122a in FIG. 6), the DMD 122 is installed on the driver PCB 221 in an operating orientation which is at an angle relative to the predetermined orientation defined in the driver PCB 221; (b) providing a illumination light beam 112a along an operating direction different from the predetermined light incident direction of the DMD 122, modulating the illumination light beam 112a to be an imaging light beam 112c by the DMD 122 and directing the imaging light beam 112c to a projection lens 130 for projecting an image. The DMD 122 is rotated about a normal vector II' through a surface of the DMD 122 at some angles, for example, 180 degrees, such that the DMD 122 is disposed on the surface 223 of the driver PCB 221 at the operating orientation, and the illuminating system 110 is left unchanged. Therefore, the illustrating light beam 112a is incident to the DMD 122 along an operating direction different from the predetermined light incident direction.

The illumination lighting beam 112a is incident to the DMD 122 along the operating direction which is different from the predetermined light incident direction of the DMD 122 in the projector 200 in the first embodiment of the present invention or the projector 300 in the second embodiment of the invention. Therefore, the micromirror 123 becomes to the off-state from the original on-state, so that the illumination light beam 112a is incident thereon will be reflected to a direction different from the direction to the projection lens 130. The micromirror 123 becomes to the on-state from the original off-state, so that the illumination light beam 112a incident thereon is reflected to the projection lens 130. The projector 200 in the first embodiment and the projector 300 in the second embodiment of the present invention, when the illumination light beam 112a is incident to the DMD along the predetermined light incident direction, the DMD with some bright defect dots will be changed from the bright defect dots into the dark defect dots to achieve a delivery standard, thereby a manufacturing cost may be lowered in some degree. In addition, to obtain a high quality of the projectors 200/300, the number of the bright defect dots to be changed into the dark defect dots is controlled from one to three. In other words, the illumination light beam 112a is incident on the DMD 122 along the predetermined light incident direction thereof, and the DMD 122 is disposed on the driver PCB 121 along the predetermined direction, the DMD 122 has the bright defect dots from one to three.

Figure 7:
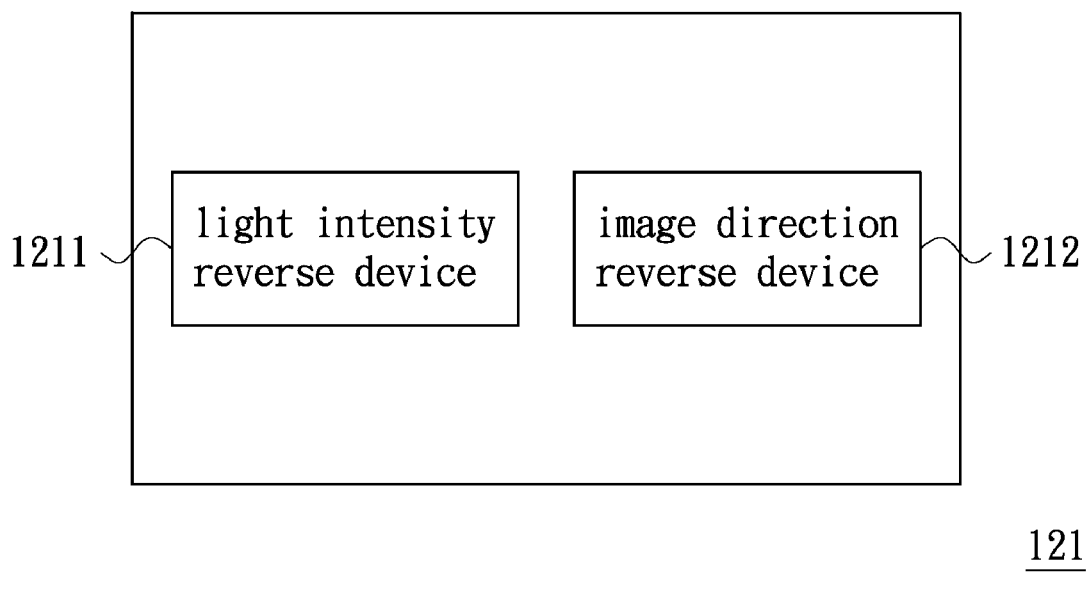
FIG. 7 is a functional block diagram of the driver printed circuit board.

In a third embodiment of the present invention, the illumination light beam 112a is incident on the DMD 122 along the operating direction different from the predetermined light incident direction of the DMD 122, and is modulated to the imaging light beam having a first light intensity of an image. The illumination light beam 112a is incident on the DMD 122 along the predetermined light incident direction of the DMD 122, and is modulated to the imaging light beam having a second light intensity of an image. The first light intensity of the image is reverse to the second light intensity. Therefore, for the correct projection, a light intensity reverse device 1211 (shown in FIG. 7) may be arranged on the driver PCB 121/221 to reverse an image signal being incident thereon. Accordingly, the method in the first and second embodiments of the invention may further include the following step: reversing a light intensity of an image of an image signal being incident on the driver PCB 121/221. Wherein the light intensity of the image of the image signal is identical with the light intensity of the image projected by the projector 200/300.

In a fourth embodiment of the invention, the illumination light beam 112*a* is incident on the DMD 122 along the operating direction different from the predetermined light incident direction of the DMD 122, and is modulated to the imaging light beam having a first image. The illumination light beam 112*a* is incident on the DMD 122 along the predetermined light incident direction of the DMD 122, and is modulated to the imaging light beam having a second image. The first image has a reverse direction to the second image. Therefore, for the correct projection, an image reverse device 1212 (shown in FIG. 7) may be arranged on the driver PCB 121/221 to reverse an image direction being incident thereon. Accordingly, the method in the first and second embodiments of the invention can further include the following step: reversing an image direction of an image signal being incident on the driver PCB 121/221. Wherein the image direction of the image of the image signal is identical with the image direction of the image projected by the projector 200/300.

Alternatively, for the correct projection, the light intensity and image direction of the image signal may be reversed before entering into projector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A displaying method of a digital light processing projector, comprising the steps of:
   providing a light modulation device, the light modulation device comprising:
      a driver printed circuit board; and
      a digital micromirror device disposed on the driver printed circuit board, comprising a plurality of micromirrors with a predetermined light incident direction, a position of each of the micromirrors being one of a first stable state and a second stable state, wherein each of the micromirrors in the first stable state reflects a light ray being incident thereon along the predetermined light incident direction to a projection lens, and each of the micromirrors in the second stable state reflects the light ray being incident thereon along the predetermined light incident direction to a direction outside the projection lens; and
   providing an illumination light beam, the illumination light beam being incident on the digital micromirror device along an operating direction different from the predetermined light incident direction, wherein each of the micromirrors in the second stable state reflects a light ray of the illumination light beam being incident thereon along the operating direction to the projection lens for projecting an image, and each of the micromirrors in the first stable state reflects the light ray of the illumination light beam being incident thereon along the operating direction to a direction outside the projection lens.

2. The displaying method of the digital light processing projector as claimed in claim 1, wherein the digital micromirror device has a predetermined orientation in the projector, the predetermined orientation is prearranged on the driver printed circuit board, and the digital micromirror device is disposed on the driver printed circuit board in an operating orientation at an angle to the predetermined orientation.

3. The displaying method of the digital light processing projector as claimed in claim 2, wherein when the digital micromirror device is disposed on the driver printed circuit board in the predetermined orientation which is prearranged on the driver printed circuit board, the digital micromirror device has a number of bright dots from one to three.

4. The displaying method of the digital light processing projector as claimed in claim 2, wherein the angle is 180 degrees.

5. The displaying method of the digital light processing projector as claimed in claim 4, further comprising reversing a light intensity of an image of an image signal being incident on the driver printed circuit board, wherein the light intensity of the image of the image signal is identical with a light intensity of the image projected by the projector.

6. The displaying method of the digital light processing projector as claimed in claim 4, further comprising reversing an image direction of an image of an image signal being incident on the driver printed circuit board, wherein the image direction of the image of the image signal is identical with an image direction of the image projected by the projector.

7. The displaying method of the digital light processing projector as claimed in claim 1, wherein the step of providing the illumination light beam comprises using a light source generating the illumination light beam, and a light axis of the illumination light beam is linear from the light source to the digital micromirror device.

8. A digital light processing projector, comprising:
an illuminating system, having a light source capable of emitting an illumination light beam ;
a projection lens, capable of projecting an image; and
a light modulation device comprising:
   a driver printed circuit board; and
   a digital micromirror device disposed on the driver printed circuit board, comprising:
a plurality of micromirrors with a predetermined light incident direction, a position of each of the micromirrors being one of a first stable state and a second stable state, wherein each of the micromirrors in the first stable state reflects a light ray being incident thereon along the predetermined light incident direction to a projection lens, and each of the micromirrors in the second stable state reflects the light ray being incident thereon along the predetermined light incident direction to a direction outside the projection lens;
wherein the illumination light beam is incident on the digital micromirror device along an operating direction different from the predetermined light incident direction, each of the micromirrors in the second stable state reflects a light ray of the illumination light beam being incident thereon along the operating direction to a projection lens for projecting an image, and each of the micromirrors in the first stable state reflects the light ray of the illumination light beam being incident thereon along the operating direction to a direction outside the projection lens.

9. The digital light processing projector as claimed in claim 8, wherein the digital micromirror device has a predetermined orientation in the projector, the predetermined orientation is prearranged on the driver printed circuit board, and the digital micromirror device is disposed on the driver printed circuit board in an operating orientation at an angle to the predetermined orientation.

10. The digital light processing projector as claimed in claim 9 wherein when the digital micromirror device is disposed on the driver printed circuit board in the predetermined orientation which is prearranged on the driver printed circuit board, the digital micromirror device has a number of bright dots from one to three.

11. The digital light processing projector as claimed in claim 9, wherein the angle is 180 degrees.

12. The digital light processing projector as claimed in claim 11, wherein the driver printed circuit board has a light intensity reverse device for reversing a light intensity of an image of an image signal being incident on the driver printed circuit board, and the light intensity of the image of the image signal is identical with a light intensity of the image projected by the projector.

13. The digital light processing projector as claimed in claim 11, wherein the driver printed circuit board has an image direction reverse device for reversing an image direction of an image of an image signal being incident on the driver printed circuit board, and the image direction of the image of the image signal is identical with an image direction of the image projected by the projector.

14. The digital light processing projector as claimed in claim 8, wherein a light axis of the illumination light beam is linear from the light source to the digital micromirror device.

* * * * *